United States Patent
Stalder et al.

(10) Patent No.: US 10,522,811 B2
(45) Date of Patent: Dec. 31, 2019

(54) ELECTROCHEMICAL CELL

(71) Applicant: The Swatch Group Research and Development Ltd, Marin (CH)

(72) Inventors: Michael Stalder, Bienne (CH); Fredy Zuellig, Delemont (CH); Pascal Heck, Gland (CH); Kurosh Sohi, Hallwil (CH); Yves Leterrier, Lausanne (CH); Jericho Lynn Moll, Lausanne (CH); Jean-Baptiste Leran, Premanon (FR); Jan-Anders Manson, Chexbres (CH)

(73) Assignee: The Swatch Group Research and Development Ltd, Marin (CH)

( * ) Notice: Subject to any disclaimer, the term of this patent is extended or adjusted under 35 U.S.C. 154(b) by 47 days.

(21) Appl. No.: 14/090,455

(22) Filed: Nov. 26, 2013

(65) Prior Publication Data
US 2014/0162116 A1    Jun. 12, 2014

(30) Foreign Application Priority Data

Nov. 29, 2012 (EP) .................................... 12194883

(51) Int. Cl.
*H01M 2/30* (2006.01)
*H01M 2/02* (2006.01)
(Continued)

(52) U.S. Cl.
CPC ........... *H01M 2/30* (2013.01); *H01M 2/0207* (2013.01); *H01M 2/0257* (2013.01);
(Continued)

(58) Field of Classification Search
CPC ............ H01M 2/30; H01M 2/06; H01M 4/66; H01M 2/0207; H01M 6/40;
(Continued)

(56) References Cited

U.S. PATENT DOCUMENTS 3,796,606 A * 3/1974 Lehmann et al. ...... H01M 4/12
429/94
4,255,189 A * 3/1981 Ray ....................... C22C 45/008
148/403

(Continued)

FOREIGN PATENT DOCUMENTS

EP          2444437    *  6/2010 ............. C08G 59/24
EP    2 395 591 A1    12/2011
(Continued)

OTHER PUBLICATIONS

English Translation of JP 2001250559 A.*
(Continued)

*Primary Examiner* — Michael L Dignan
(74) *Attorney, Agent, or Firm* — Oblon, McClelland, Maier & Neustadt, L.L.P.

(57) ABSTRACT

The present invention relates to an electrochemical cell, comprising:
  an anode in contact with an anode current collector,
  a cathode in contact with a cathode current collector,
  a separator disposed between the anode and the cathode, wherein the anode is disposed between the separator and the anode current collector and wherein the cathode is disposed between the separator and the cathode current collector,
  wherein the anode current collector and the cathode current collector form an encapsulating housing for the assembly of anode, cathode and separator.

13 Claims, 3 Drawing Sheets

(51) Int. Cl.
  *H01M 4/66* (2006.01)
  *H01M 10/04* (2006.01)
  *H01M 2/04* (2006.01)
  *H01M 6/40* (2006.01)
  *H01M 4/76* (2006.01)
  *C22C 45/04* (2006.01)

(52) U.S. Cl.
  CPC ....... *H01M 2/0285* (2013.01); *H01M 2/0469* (2013.01); *H01M 4/661* (2013.01); *H01M 4/665* (2013.01); *H01M 4/666* (2013.01); *H01M 4/76* (2013.01); *H01M 6/40* (2013.01); *H01M 10/0436* (2013.01); *C22C 45/04* (2013.01)

(58) Field of Classification Search
  CPC .. H01M 10/0436; H01M 4/76; H01M 2/0469; H01M 4/665; H01M 4/661; H01M 2/0285; H01M 2/0257; H01M 4/666; H01M 4/667; H01G 9/155; C22C 45/04; C22C 45/008
  USPC .................... 429/94, 149, 121, 179
  See application file for complete search history.

(56) References Cited

U.S. PATENT DOCUMENTS

| | | | | |
|---|---|---|---|---|
| 6,010,317 | A * | 1/2000 | Maget | A61M 5/14526 417/379 |
| 6,224,997 | B1 | 5/2001 | Papadopoulos | |
| 6,451,478 | B1 * | 9/2002 | Okahisa | H01M 2/0222 429/162 |
| 2002/0031704 | A1 * | 3/2002 | Okahisa | H01M 2/0207 429/162 |
| 2004/0041537 | A1 * | 3/2004 | Ishida | H01M 2/0212 320/107 |
| 2006/0246353 | A1 * | 11/2006 | Guo | H01M 2/0222 429/245 |
| 2008/0113270 | A1 * | 5/2008 | Hirose | H01M 4/0423 429/231.95 |
| 2010/0015517 | A1 * | 1/2010 | Fujita | H01M 4/14 429/149 |
| 2010/0178543 | A1 * | 7/2010 | Gruner | B82Y 30/00 429/121 |
| 2011/0159381 | A1 * | 6/2011 | Doe | H01M 4/13 429/337 |
| 2011/0189528 | A1 | 8/2011 | Wu et al. | |
| 2011/0236755 | A1 * | 9/2011 | Ogino | H01G 11/28 429/218.1 |
| 2011/0281167 | A1 | 11/2011 | Sabi et al. | |
| 2012/0034521 | A1 * | 2/2012 | Matsuyama | H01M 4/661 429/211 |
| 2012/0058378 | A1 | 3/2012 | Lee et al. | |
| 2012/0156546 | A1 | 6/2012 | Amano et al. | |
| 2013/0017438 | A1 * | 1/2013 | Taguchi | H01G 11/06 429/179 |
| 2013/0133185 | A1 | 5/2013 | Wu et al. | |

FOREIGN PATENT DOCUMENTS

| | | | |
|---|---|---|---|
| EP | 2 444 437 A1 | 4/2012 | |
| JP | 2001250559 A * | 9/2001 | ............. H01M 4/66 |
| WO | WO 2011/122181 * | 10/2011 | ............. H01G 9/155 |
| WO | WO2011/122181 * | 10/2011 | ............. H01G 9/155 |

OTHER PUBLICATIONS

Arora et al. "Mathematical Modeling of the Lithium Deposition Overcharge Reaction in Lithium-Ion Batteries Using Carbon-Based Negative Electrodes." Journal of the Electrochemical Society, 146 (10) 3543-3553 (1999) (Year: 1999).*

Tang et al. "Two-Dimensional Modeling of Lithium Deposition During Cell Charging." Journal of the Electrochemical Society 156 (5) A390-A399 (2009) (Year: 2009).*

European Search Report dated Jul. 11, 2013, in European Application No. 12 19 4883 filed Nov. 29, 2012.

* cited by examiner

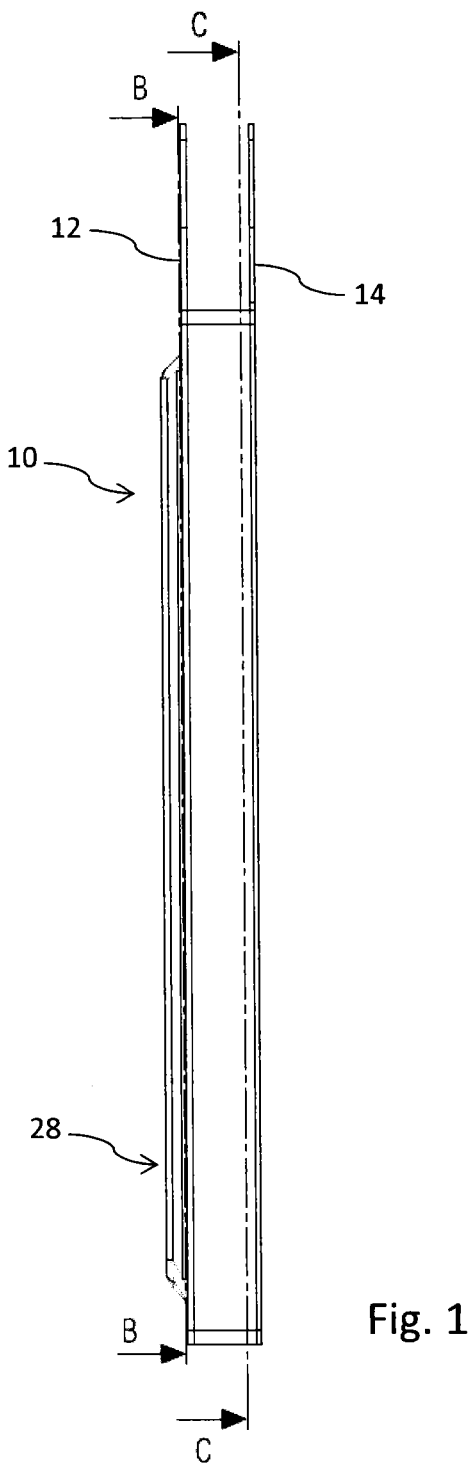
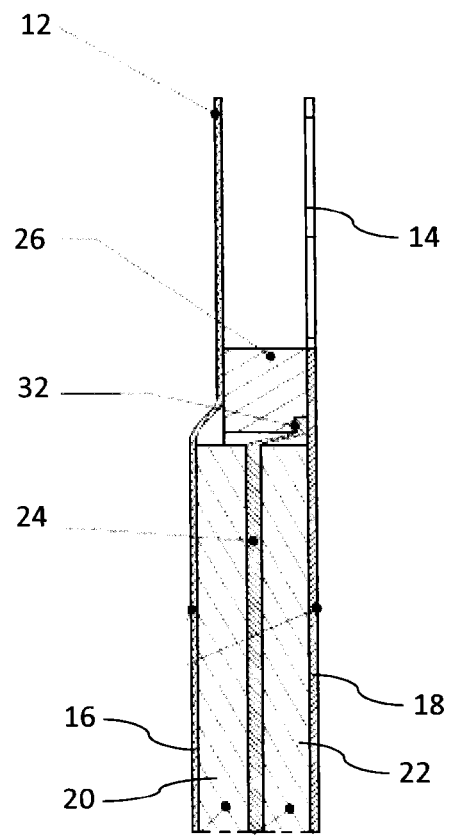
Fig. 1
Fig. 2

B-B

C-C

ELECTROCHEMICAL CELL

This application claims priority from European Patent Application No. 12194883.0 filed Nov. 29, 2012, the entire disclosure of which is incorporated by reference.

FIELD OF THE INVENTION

The present invention relates to the field of electrochemical cells comprising an anode in contact with an anode current collector and comprising a cathode in contact with a cathode current collector. In particular, the invention relates to film batteries featuring a large degree of mechanical flexibility.

BACKGROUND AND PRIOR ART

Among a multitude of different battery types, there exist so-called film batteries. Those batteries are composed of thin materials with thickness in the range of micrometers, allowing a total battery thickness in the range of 1 mm or less. So they may exhibit small dimensions and are therefore applicable to a large spectrum of different applications. Generally, such batteries or electrochemical cells can be formed into any arbitrary shape. They can be stacked, used in parallel and generally provide a comparatively large energy density.

Film electrochemical cells may also provide a particular mechanical flexibility. Hence, they are typically bendable and elastically deformable to a certain degree. This property is of prime importance for reliable portable products subject to mechanical stress, like smart cards, etc . . . .

Electrochemical cells typically comprise an anode, an anode current collector, a cathode, a cathode current collector, a separator extending between anode and cathode and an electrolyte. Moreover and in order to provide a desired mechanical flexibility, anode and cathode current collectors have to provide corresponding flexible properties. Since the current collectors are typically arranged at the outside facing portions of anode and cathode, they may become particularly subject to mechanical stress when the electrochemical cell is bent.

In practical applications and in particular after a number of bending or folding operations, e.g. after about 100 or 500 bending operations, conventional current collectors may exhibit a fissured structure or may even tend to show damaged portions at least on their surface. Such current collectors typically formed on the basis of metal foils therefore tend to deteriorate in response to repeated bending operations.

Additionally, conventional electrochemical cells always comprise a housing or an encapsulation, e.g. a polymer/aluminum/polymer laminate to receive and to enclose the assembly of anode current collector, anode, separator, electrolyte, cathode and cathode current collector. For contacting the current collectors with connector tabs extending through the housing, a rather elaborate mutual interconnection of current collectors and connector tabs must be provided. Additionally, the connector tabs have to be passed through the encapsulation or housing, e.g. by means of polymeric sleeves. The interconnection of connector tabs with current collectors is rather space consuming and limits the spatial energy density of the electrochemical cell.

It is therefore an object of the present invention to provide an improved electrochemical cell with an increased volumic energy density. In another object, the invention should provide a flexible electrochemical cell being less prone and less sensitive to repeated bending or folding operations. Moreover, the internal structure of the electrochemical cell should be rather simple, space saving and their production should be cost efficient.

SUMMARY OF THE INVENTION

In a first aspect, the invention relates to an electrochemical cell. The electrochemical cell comprises an anode in contact with an anode current collector and further comprises a cathode in contact with a cathode current collector. Furthermore, the electrochemical cell comprises a separator disposed between the anode and the cathode and an electrolyte. In particular, the separator is sandwiched between anode and cathode and anode and cathode current collectors are disposed adjacent to that side of anode and cathode, respectively that faces away from the separator. In other words, the anode is disposed between the separator and the anode current collector. Correspondingly, also the cathode is disposed between the separator and the cathode current collector. As mentioned above, there is also provided an electrolyte of either liquid, gel-like or solid type, which effectively fills the pores of the separator between the cathode and the anode.

The anode current collector and the cathode current collector form an encapsulating housing for the mechanical assembly of anode, cathode and separator. This way, a conventional housing or encapsulation of an electrochemical cell can be effectively replaced by the anode and cathode current collectors. In particular, the housing of the electrochemical cell consists of mutually interconnected anode and cathode current collectors. Apart from their electrical conducting capability anode and cathode current collectors now also provide mechanical stability and mechanical protection for the electrochemical cell.

Since anode and cathode current collectors directly form the encapsulating housing of the electrochemical cell, connector tabs do no longer have to be interconnected with anode and/or cathode current collectors inside an encapsulating housing of an electrochemical cell. Instead, anode and cathode current collectors may directly provide respective connector tabs or may be integrally formed with respective connector tabs. In this way, the volume conventionally required for the interconnection of connector tabs with current collectors can be saved. In effect, the size of cathode and anode can be increased correspondingly without increasing the external dimensions of the electrochemical cell. In effect, the storage capacity and hence the energy density of the electrochemical cell can be remarkably increased.

Additionally, by substituting the housing or encapsulation of an electrochemical cell by means anode and cathode current collectors, the overall thickness of the electrochemical cell can be decreased. Furthermore, the electrical energy density can be further increased for a fixed total thickness of the cell. But a decrease in thickness may also come along with an increase of flexibility of the electrochemical cell.

According to a further embodiment, the anode current collector and the cathode current collector are mutually bonded by means of a seal extending between the outer edges of the anode current collector and the cathode current collector. Typically, the seal is sandwiched or squeezed between anode and cathode current collectors. Typically, the outer edges of cathode and anode current collectors are flush with respect to each other and may also be flush with respect to the seal disposed there between.

The seal comprises a substantially electrically insulating material for electrically separating cathode and anode current collectors. Typically, the seal comprises an adhesive, e.g. a hot melt, such like polyvinyl acetate (PVA) or similar adhesives. The seal as well as the current collectors and their mutual interconnection are gas- and liquid tight in order to prevent evaporation or leakage of the electrolyte material disposed in the electrochemical cell, as well as prevent the penetration of air into the cell.

In order to provide a hermetic encapsulating housing, the anode and cathode current collectors are mutually bonded by means of the seal along the entirety of their outer circumference.

According to another embodiment, at least one of anode current collector and cathode current collector comprises an amorphous metallic material. Preferably, both, anode and cathode current collectors comprise an amorphous material.

Furthermore and according to another preferred embodiment, at least one of anode current collector and cathode current collector at least partially consists of an amorphous metallic material. Preferably, both, anode and cathode current collectors at least partially or substantially entirely consist of an amorphous metallic material, preferably an amorphous metallic alloy.

Consequently, anode current collector and/or cathode current collector may comprise a bulk amorphous metallic material. Preferably, such amorphous metallic materials comprise a maximum resistivity of $10^{-5}$ Ohm*m. Moreover, the maximum resistivity may even be in the range of $10^{-6}$ Ohm*m. Consequently, the amorphous metallic material may provide a good or even excellent electrical conductivity. Additionally, amorphous metallic materials feature a larger degree of flexibility compared to crystalline metallic materials. In particular, the elastic limit of amorphous metallic materials is generally much larger compared to the elastic limit of crystalline metallic materials. Typically, the elastic limit of amorphous metallic materials is two to four times larger than the elastic limit of crystalline metallic materials.

Use of current collectors comprising or even consisting of amorphous metallic material therefore provides anode and cathode current collectors with excellent elastic properties.

According to a further preferred embodiment at least one of anode current collector and cathode current collector comprises a thickness of less than 25 μm, less than 15 μm or even less than 10 μm. Even though the current collectors may be comparatively thin, they still provide sufficient mechanical stability to form a comparatively robust encapsulating housing for the electrochemical cell. Moreover, the thickness of the current collectors typically influences the flexibility of the current collectors and of the electrochemical cell. Additionally, the limited thickness of the current collectors allows for a rather compact and space saving design of the electrochemical cell.

According to a further embodiment, the amorphous metallic material comprises an alloy of Ni, Cr, Fe, Si, C, B. Additionally or alternatively, the amorphous metallic alloy may comprise at least one or several of the following materials: Ti, Zr, Cu, Mn, V, W, Al.

In preferred embodiments, the alloy comprises between 7-19 wt.-% Cr, between 4-5 wt.-% Fe, between 4.5-7.5 wt.-% Si, less than 0.1 wt.-% C, between 1.4-4.0 wt.-% B and between 71 wt.-% and 92 wt.-% Ni. A typical embodiment of an amorphous metallic alloy comprises 80.74 wt.-% Ni, 7.0 wt.-% Cr, 4.5 wt.-% Fe, 4.5 wt.-% Si, 0.06 wt.-% C and 3.2 wt.-% B.

In a further aspect and according to another embodiment, at least one of anode current collector and cathode current collector comprises a fiber reinforced plastic material. Preferably both, anode and cathode current collectors comprise a fiber reinforced plastic material. Typically, anode and cathode current collectors comprise a kind of carbon fiber reinforced polymeric foil. In particular, the fiber reinforced plastic material may comprise a unidirectional tape made of carbon fibers impregnated with a thermal set epoxy resin system. The fibers are for instance Toray T800H, but any comparable type of fibers can be used. The fiber areal weight of such fiber reinforced plastic material may range from 25 gram per square meter to 300 g/m$^2$. Moreover, the standard fiber content may range from 60-65% by weight. The mean value of the flexural modulus of the fiber reinforced plastic material may range between 2000 MPa and 5000 MPa, preferably around 3500 MPa. The mean value of flexural strength may range between 80 MPa and 180 MPa, preferably around 130 MPa. Moreover, the mean value of strain at maximum load may be around 5% to 10%, preferably around 7%.

Preferentially a 3-ply laminate of such unidirectional tapes is used, such as the unidirectional lamina are oriented crosswise to each other, corresponding to a [0°/90°/0°] laminate. The areal density of such a 3-layer laminate will therefore range from 75 to 900 g/m$^2$, but preferentially below 150 g/m$^2$. Such 3-ply laminates have a strain at maximum load around 2.5%.

In a further preferred embodiment, at least one current collector of fiber reinforced plastic material comprises a thickness of less than 100 μm, less than 50 μm, preferably less than 45 μm. This way, the fiber reinforced material is provided as a comparatively thin foil providing a large degree of flexibility paired with mechanical strength.

Additionally and according to another embodiment, the fiber reinforced plastic material is at least partially coated with a metallic layer. The metallic layer may comprise a crystalline metallic or amorphous metallic structure. When using Ni as material for a metallic layer, the thickness of the metallic layer is typically less than 1 μm, preferably in the range between 200 nm and 400 nm.

By means of an at least partial coating of the fiber reinforced plastic material by means of a metallic layer or coating, the electrical conductivity of the current collector can be enhanced. Moreover, by means of the metal layer a permeability of the respective current collector can be substantially decreased in order to prevent leakage or evaporation of the electrolyte and diffusion of air into the cell.

According to another aspect and independent of the choice of material of anode or cathode current collector at least one of anode current collector and cathode current collector is elastically deformable. In the present context, elastic deformation means a temporary deformation of the respective current collector against the action of a restoring force. As soon as an external force effect is no longer present on the respective current collector, the elastic property of the material the respective current collector is made of provides a reset or restoring force, by way of which an initial shape and configuration of the respective current collector can be obtained.

It is of particular benefit, that any conceivable deformation or bending of the current collectors or of the entire electrochemical cell does not exceed the elastic limits of the material the current collectors are made of. It is due to the elastic properties of the current collectors, that the current collectors as well as the entire electrochemical cell may become subject to repeated bending or flexing procedures without deteriorating the surface or the structure of the respective current collector, and so preserving the function of the cell. Both, the fiber reinforced plastic material as well as the amorphous metallic material the anode and/or cathode current collectors may be made of, can provide a substantially non-deteriorated structure or surface after 500 or even more bending or flexing operations.

According to a further preferred embodiment, at least one of anode current collector and cathode current collector is substantially kink-free bendable up to a bending radius smaller than or equal to 20 mm, 15 mm or even smaller than or equal to 10 mm. Such a comparatively small bending radius is particularly attainable either by means of an amorphous metallic material or by means of a fiber reinforced plastic material as described above and to be used as a material for anode and/or cathode current collector.

Since these particular materials are almost kink-free bendable, repeated and multiple bending and flexing operations can be performed without any wear or measurable degradation of the elastic or electrical properties of the current collectors. The highly positive consequence of the absence of kinks is that the internal layers of the electrochemical cell stay intact. A kink can be considered as a locally much smaller bending radius, which would deteriorate the cathode and the anode layers.

According to another embodiment, the electrochemical cell further comprises an anode connector tab and a cathode connector tab. Here, at least one of anode connector tab and cathode connector tab is integrally formed with the anode current collector or with the cathode current collector, respectively. Since the current collectors form the encapsulating housing of the electrochemical cell, a separate interconnection of connector tabs and current collectors inside the housing of the electrochemical cell is no longer required. Moreover, by integrating the connector tabs into the respective current collectors, a rather space saving arrangement and an intuitive and easy assembly of the electrochemical cell can be provided.

In another embodiment, the separator disposed between anode and cathode comprises an outer edge extending beyond an outer edge of the anode and/or cathode. By means of its outer edge, the separator may engage or may be interconnected with the seal and/or with at least one anode current collector and cathode current collector. Preferably, the separator is squeezed or pinched between the seal and one of anode or cathode current collectors. In this way, assembly and fixing of the separator may be attained in one step together with the mutual assembly and interconnection of anode and cathode current collectors by means of the seal.

In a further embodiment, the electrochemical cell is designed as a primary or secondary battery. The electrochemical cell may be particularly designed for various application purposes. In particular, the electrochemical cell may be applicable in a time piece or watch, in a smartcard or in a cellular phone.

BRIEF DESCRIPTION OF THE DRAWINGS

In the following, an embodiment of the invention will be described by making reference to the drawings, in which:

FIG. 1 shows a schematic side view of the electrochemical cell,

FIG. 2 shows a longitudinal cross-section through the electrochemical cell according to FIG. 1.

DETAILED DESCRIPTION

Figure 3:
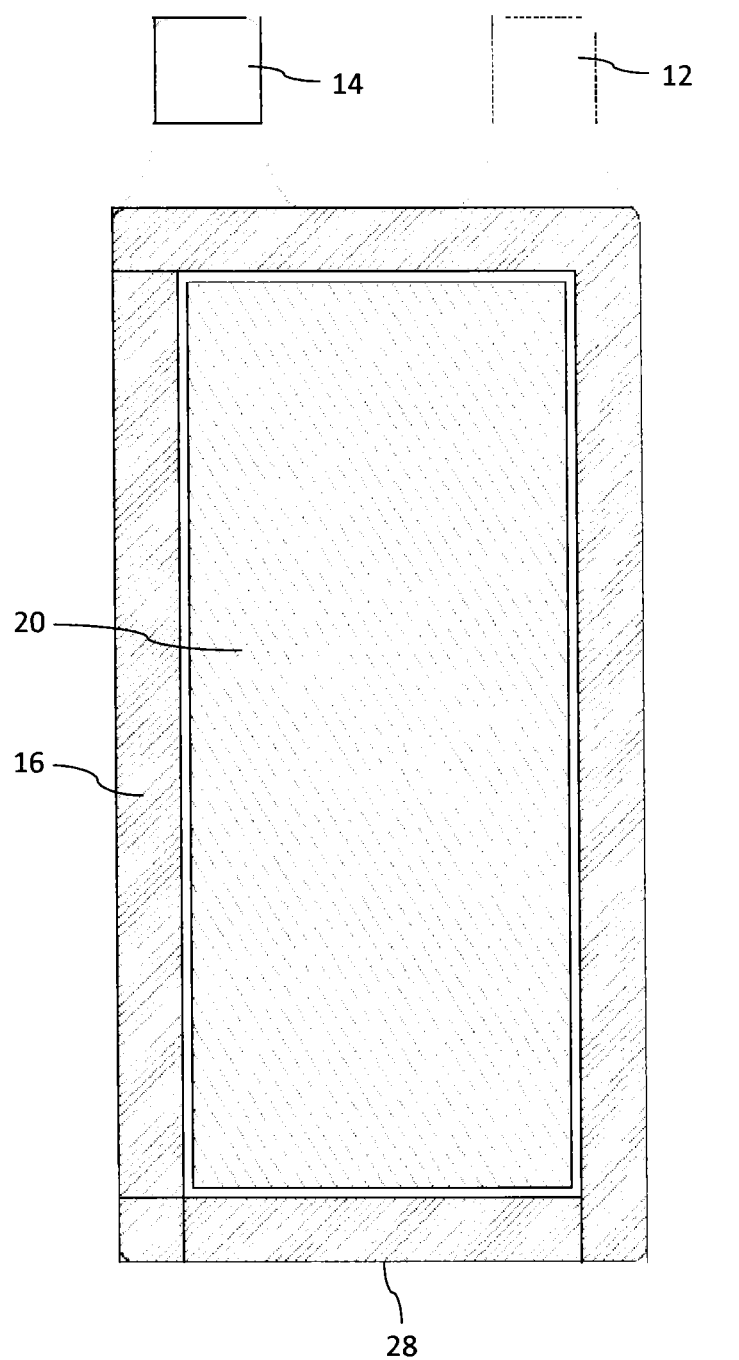
FIG. 3 shows a planar cross-section along B-B according to FIG. 1

The electrochemical cell 10 as illustrated in FIGS. 1-4 comprises a substantially planar-shaped cathode current collector 18 in contact with a cathode 22. Opposite the cathode current collector 18, the cathode 22 is in connection with a separator 24, in order to separate the cathode 22 from an anode 20. Hence, cathode 22 and anode 20 sandwich the separator 24 there between. The anode 20 is further in contact with an anode current collector 16 as illustrated in FIG. 2. The electrochemical cell further comprises an electrolyte filling the pores of the anode 20, of cathode 20 and separator 24. The electrolyte can be formed for example by a mixture of ethylene carbonate and lithium hexafluoride. Typically separator 24 can be made of porous polypropylene.

As becomes further apparent from FIGS. 1 and 2, the anode current collector 16 and the cathode current collector 18 directly form an encapsulating housing 28 of the electrochemical cell 10. In this way, a separate encapsulation or housing to receive an anode or cathode current collector 16, 18 is no longer required. Moreover, the anode current collector 16 can be integrally formed with a connector tab 12. Correspondingly, also the cathode current collector 18 can be integrally formed with a respective cathode connector tab 14 as becomes apparent from the cross-section of FIG. 2.

The sandwich structure and assembly of cathode current collector 18, cathode 22, separator 24, anode 20 and anode current collector 16 is kept together by means of a seal 26 extending all around the outer edges 28, 30 of anode current collector 16 and cathode current collector 18. In the cross-sectional illustration according to FIG. 3 only a lower edge 28 of the anode current collector 16 is indicated.

Figure 4:
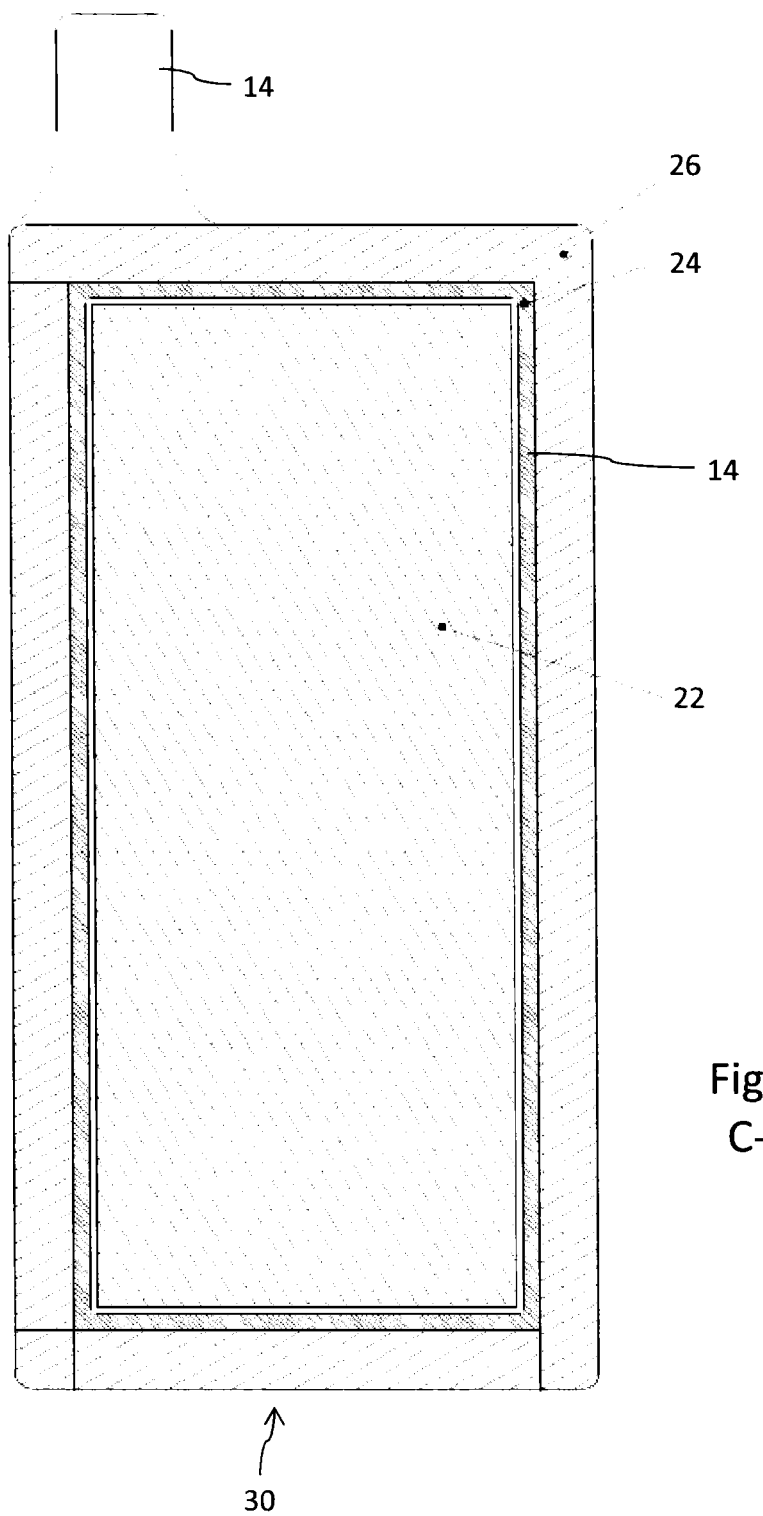
FIG. 4 shows a planar cross-section along C-C according to FIG. 1.

In FIG. 4, the corresponding lower edge 30 of the cathode current collector 18 is completely covered with the seal 26 or sealing material. As can be further seen from the cross-section according to FIG. 4, the cathode 22 is circumferentially encapsulated by the separator 24, which extends between the anode 20 and cathode 22. Moreover, as shown in FIG. 2, the separator 24 extends beyond the side edges of the cathode 22 and is directly interconnected with the cathode current collector 18 supporting the cathode 22. As shown in FIG. 2, the outer edge 32 of the separator 24 is squeezed or pinched between the seal 26 and the cathode current collector 18.

The seal 26 typically comprises a hot melt, such like PVA and provides a hermetic seal between anode and cathode current collectors 16, 18. Moreover, anode and cathode current collectors 16, 18 are also liquid and gas tight, hence substantially impenetrable, in order to prevent evaporation or leakage of an electrolyte disposed between the current collectors 16, 18.

Since the connector tabs 12, 14 are integrally formed and integrated into the encapsulating housing 28, there is no need to guide the connector tabs through an encapsulation of the electrochemical cell. Moreover, almost the entire interior space formed by the encapsulation of anode current collector 16, cathode current collector 18, separator 24 and seal 26 can be substantially filled with electrochemically active material forming the anode 20 and cathode 22. In this way, energy- and power density of the entire electrochemical cell 10 can be enhanced.

Anode current collector 16 and cathode current collector 18 are made of an elastically deformable material, preferably of an amorphous metallic alloy. Alternatively, anode and cathode current collectors 16, 18 may comprise or may consist of a fiber reinforced plastic material, which may be eventually coated with a metallic layer, of e.g. Ni, or other electrically conductive material, like graphene, or some oxides (like indium zinc oxide ("IZO"), or some conductive polymers (like poly(3,4-ethylenedioxthiophene) ("PEDOT") to enhance its electrical conductivity.

With the described choice of materials to be used for manufacturing anode and/or cathode current collectors 16, 18, the overall flexibility of the current collectors and/or of the entire electrochemical cell may allow bending and flexing operations in a kink-free way up to a bending radius smaller than or equal to 20 mm, 15 mm or even smaller than or equal to 10 mm. Even with such small bending radius, numerous bending or flexing operations, at least 500 or more, can be conducted without significantly deteriorating the electrical or mechanical properties of the current collectors 16, 18.

LIST OF REFERENCE NUMERALS 10 electrochemical cell
12 connector tab
14 connector tab
16 current collector
18 current collector
20 anode
22 cathode
24 separator
26 seal
28 edge
30 edge
32 edge

What is claimed is:

1. An electrochemical cell, comprising:
   an anode in contact with an anode current collector;
   a cathode in contact with a cathode current collector;
   a separator disposed between the anode and the cathode;
   an encapsulating housing consisting of the anode current collector, the cathode current collector, and a seal extending between the outer edges of the anode current collector and the cathode current collector; and
   an anode connector tab and a cathode connector tab, wherein at least one of the anode connector tab and the cathode connector tab is integrally formed with the anode current collector or with the cathode current collector, respectively,
   wherein the encapsulating housing encapsulates the anode, the cathode, and the separator,
   wherein the anode is disposed between the separator and the anode current collector and wherein the cathode is disposed between the separator and the cathode current collector,
   wherein at least one of the anode current collector and the cathode current collector has a thickness of less than 25 μm and comprises an amorphous metallic material, and
   wherein the amorphous metallic material comprises a Ni alloy comprising, based on a total weight of the alloy:
      71-92 wt.-% Ni;
      7-19 wt.-% Cr;
      4.5-7.5 wt.-% Si;
      4-5 wt.-% Fe,
      1.4-4.0 wt.-% B; and
      less than 0.1 wt.-% C.

2. The electrochemical cell according to claim 1, further comprising:
   an electrolyte, which fills pores of the anode, of the cathode, and of the separator.

3. The electrochemical cell according to claim 1, wherein the at least one of the anode current collector and the cathode current collector at least partially consists of the amorphous metallic material.

4. The electrochemical cell according to claim 1, wherein the at least one of the anode current collector and the cathode current collector has a thickness of less than 15 μm.

5. The electrochemical cell according to claim 1, wherein at least one of the anode current collector and the cathode current collector is elastically deformable up to a curvature radius equal to 10 mm.

6. The electrochemical cell according to claim 5, wherein at least one of the anode current collector and the cathode current collector is substantially kink-free bendable up to a bending radius smaller than or equal to 20 mm.

7. The electrochemical cell according to claim 1, wherein the separator comprises an outer edge extending beyond an outer edge of the anode and/or cathode to engage with the seal and/or with at least one of anode current collector and cathode current collector.

8. The electrochemical cell according to claim 1, being designed as a primary or secondary battery.

9. The electrochemical cell according to claim 1, wherein the seal comprises an electrically insulating material such that the cathode current collector and the anode current collector are electrically separated.

10. The electrochemical cell according to claim 1, wherein the seal comprises a polyvinyl acetate adhesive.

11. An electrochemical cell, comprising:
    an anode in contact with an anode current collector;
    a cathode in contact with a cathode current collector;
    a separator disposed between the anode and the cathode; and
    an encapsulating housing consisting of the anode current collector, the cathode current collector, and a seal extending between the outer edges of the anode current collector and the cathode current collector,
    wherein the encapsulating housing encapsulates the anode, the cathode, and the separator,
    wherein the anode is disposed between the separator and the anode current collector and wherein the cathode is disposed between the separator and the cathode current collector,
    wherein at least one of the anode current collector and the cathode current collector has a thickness of less than 25 μm and comprises an amorphous metallic material,
    wherein at least one of the anode current collector and the cathode current collector is elastically deformable up to a curvature radius equal to 10 mm, and
    wherein the amorphous metallic material comprises a Ni alloy comprising, based on a total weight of the alloy:
       71-92 wt.-% Ni;
       7-19 wt.-% Cr;
       4.5-7.5 wt.-% Si;
       4-5 wt.-% Fe;
       1.4-4.0 wt.-% B; and
       less than 0.1 wt.-% C.

12. The electrochemical cell according to claim 1, wherein the anode current collector has a thickness of less than 25 μm and comprises the amorphous metallic material.

13. The electrochemical cell according to claim 1, wherein the cathode current collector has a thickness of less than 25 μm and comprises the amorphous metallic material.

* * * * *